United States Patent [19]

Katagiri et al.

[11] Patent Number: 5,309,244
[45] Date of Patent: * May 3, 1994

[54] IMAGE PROCESS APPARATUS WITH HOLOGRAM LENSES ARRANGED IN A CONCENTRIC FORM OR A SPIRAL FORM

[75] Inventors: Masayuki Katagiri; Kengo Takahama; Noritoshi Kako, all of Nara, Japan

[73] Assignee: Sharp Kabushiki Kaisha, Osaka, Japan

[ * ] Notice: The portion of the term of this patent subsequent to Aug. 10, 2010 has been disclaimed.

[21] Appl. No.: 707,146

[22] Filed: May 31, 1991

[30] Foreign Application Priority Data

Jun. 8, 1990 [JP] Japan ................... 2-150527

[51] Int. Cl.$^5$ ........................ H04N 1/23; G01D 9/42
[52] U.S. Cl. .................... 358/296; 359/17; 359/26; 346/108
[58] Field of Search ............... 358/296; 346/108, 160; 359/29, 39, 17–19, 22, 26; 372/9, 24, 26

[56] References Cited

U.S. PATENT DOCUMENTS

| | | | |
|---|---|---|---|
| 3,922,059 | 11/1975 | Noguchi | 346/108 X |
| 4,150,396 | 4/1979 | Hareng et al. | 358/60 |
| 4,831,452 | 5/1989 | Takanashi et al. | 358/213.14 |
| 5,128,693 | 7/1992 | Tatemichi et al. | 346/108 |

FOREIGN PATENT DOCUMENTS

55-45003 3/1980 Japan .
62-4922 1/1985 Japan .
62-266518 11/1987 Japan .

Primary Examiner—Benjamin R. Fuller
Assistant Examiner—Eric Frahm
Attorney, Agent, or Firm—Nixon & Vanderhye

[57] ABSTRACT

An image processing apparatus is provided to have a spatial light modulator onto and from which an image data is written and read, a digital reading system for digitally reading an image data written on the spatial light modulator, a processing unit for processing the read image data, and a digital writing system for digitally writing the processed data on the spatial light modulator. The digital reading or writing system serves to two-dimensionally move a laser beam on the spatial light modulator for reading or writing an image data from or onto the spatial light modulator. The digital reading or writing system provides a hologram disk having hologram lenses located in a concentric or spiral manner. The hologram disk is arranged to deflect the laser beam vertically and horizontally for scanning the spatial modulating element.

24 Claims, 4 Drawing Sheets

IMAGE PROCESS APPARATUS WITH HOLOGRAM LENSES ARRANGED IN A CONCENTRIC FORM OR A SPIRAL FORM

RELATED APPLICATION

This application is related to earlier filed, commonly assigned, application Ser. No. 07/624,729 filed Dec. 11, 1990 entitled "Image Processing Apparatus" and naming Katagiri, Kako and Noguchi as inventors.

BACKGROUND OF THE INVENTION

1. Field of the Invention

The present invention relates to an image processing apparatus which employs a spatial light modulator and a laser beam scanning system for processing an image data.

2. Description of the Related Art

Inventors know a color copying machine for creating, editing, and copying a color image. In general, such the color copying machine employs an analog type or a digital type, each of which has the corresponding merits and demerits.

As for color correction or tone processing, an analog type color copying machine is inferior to a digital type color copying machine. This is because the analog type color copying machine is arranged to directly expose and develop an optical image for creating a color copy, on the contrary, the digital type color copying machine is arranged to convert an original image data into a digital signal with an image scanner and output the color copy from a printer depending on the converted digital signal.

As for the resulting color copy, the analog type color copying machine can provide a smoother image (resolution is about 800 DPI) but inferior color reproduction, because the analog type machine cannot easily perform color masking (for separating black from chromatic colors) of an image data. In actual, the black lines are colored into chromatic colors on the resulting copy. The digital type color copying machine, on the other hand, provides easier color masking and superior color reproduction. However, the digital type machine has some difficulty in making the resulting copy more fine. That is, as more reading pixels are prepared for creating more fine copy, more memories are necessary. For the purpose, the digital type machine requires a high-speed processor and a large capacity memory, resulting in pushing up the cost of the digital type machine far higher than the analog type machine.

As will be appreciated from the above description, the analog type color copying machine is superior in treating a large amount of copies, while the digital type color copying machine is superior in creating a graphic design copy to be color-reproduced as exactly as possible or printing a small amount of copies.

The analog type color copying machine and the digital type color copying machine have been selected on the basis of an image type, a processing purpose, and a way of use, because they have their own merits and demerits as stated above.

However, there has been provided no apparatus functioning as both the analog and the digital type color copying machines wherein the merits of both machines are realized. Hence, it has been necessary to use a very expensive digital copying machine for creating a highly fine color copy at excellent color reproduction.

Moreover, there has been provided no apparatus which allows an analog image and a digital image to be mixed on one copy.

For implementing the latter apparatus, the present applicant has proposed an image processing apparatus which is capable of outputting a high-resolution and high-color-reproduction image having an analog image and a digital image mixed thereon (U.S. patent application Ser. No. 07/624,729, filed on Dec. 11, 1990, U.S. Pat. No. 5,235,437).

The proposed image processing apparatus includes an analog writing system for analogously writing a reflected image data of an original onto a spatial light modulator employing a liquid-crystal when a light beam through the original from a light source is applied to the spatial light modulator, a digital reading system for digitally reading out an image data written on the spatial light modulator by two-dimensionally scanning the element with a laser beam, a processing unit for processing the read image data, a digital writing system for digitally writing the processed image data on the spatial light modulator by two-dimensionally scanning the element with a laser beam, and an analog reading system for analogously reading out the image data written on the spatial light modulator.

The scanning system for two-dimensionally moving the laser beam on the spatial light modulator for scanning the element will be described below.

The scanning system includes a laser beam source, lenses, a main-scanning galvanometer and a sub-scanning galvanometer.

The laser beam source, which can apply a laser beam to the spatial light modulator through the lenses so that the laser beam focuses on the spatial light modulator. On the optical path of the laser beam are provided the main-scanning galvanometer and the sub-scanning galvanometer, both of which serve to two-dimensionally move the focused laser beam on the spatial light modulator so that the laser beam spot is scanned on the modulator. That is, the main-scanning galvanometer serves to horizontally move the laser beam spot along one line and the sub-scanning galvanometer serves to vertically move the laser beam upper or lower to the next line. A scanning control unit is provided in the scanning system so as to supply a control signal for controlling the main-scanning and the sub-scanning galvanometers.

The scanning system further includes an F$\theta$ lens, a photo-detector and a lens. The F$\theta$ lens is used for correcting a difference between an optical length to the center of the spatial light modulator and the optical length to the peripheral portion of the element so that the laser beam is allowed to be focused at any location of the spatial light modulator.

The laser beam applied to the spatial light modulator is modulated therein and then applied to the photo-detector through the lens.

In the digital reading system, the laser beam source serves to apply the constant-intensity laser beam to the spatial light modulator through the main-scanning galvanometer and the sub-scanning galvanometer. Both galvanometers serve to two-dimensionally move the laser beam on the spatial light modulator so that the element is scanned with the laser beam. Then, the beam modulated in the spatial light modulator is received in the photo-detector.

In the digital writing system, a laser modulating circuit is provided so that the intensity of the laser beam emitted from the laser beam source is modulated. Then, the modulated laser beam is passed through the main-scanning galvanometer and the sub-scanning galvanometer so as to two-dimensionally scan the spatial light modulator.

The foregoing proposed image processing apparatus, however, requires a main-scanning mechanism and a sub-scanning mechanism for two-dimensionally moving a laser beam for scanning, that is, provides a more complicated optical system containing a scanning system. It results in lowering the productivity and reliability of the image processing apparatus and making the apparatus more bulky. In particular, in case that the digital reading and writing system are located in respective places, a pair of main-scanning and sub-scanning galvanometers are required for each system, resulting in making the apparatus more complicated.

SUMMARY OF THE INVENTION

It is therefore an object of the present invention to provide an image processing apparatus which provides a laser beam scanning system having simple construction for enhancing the productivity and reliability and reducing the apparatus in size.

The object of the present invention can be achieved by the image processing apparatus including a spatial light modulator onto and from which an image data is written and read, a digital reading system for digitally reading an image data written on the spatial light modulator, a processing unit for processing the read image data, and a digital writing system for digitally writing the processed data on the spatial light modulator. The digital reading or writing system serves to two-dimensionally move a laser beam on the spatial light modulator for reading or writing an image data from or onto the spatial light modulator. The digital reading or writing system provides a hologram disk having hologram lenses located in a concentric or spiral manner. The hologram disk is arranged to deflect the laser beam vertically and horizontally for scanning the spatial modulating element.

In operation, when the laser beam is applied to the original, the image of the original is focused and analogously written on the spatial light modulator. Then, the hologram disk having hologram lenses located in a spiral or concentric manner serves to two-dimensionally move the laser beam on the spatial light modulator so as to digitally read out the image data at each pixel. Then, the read image data is subject to desired processing. The processed image data is again written on the spatial light modulator by the laser beam moved by the hologram disk in a similar manner. Lastly, the image data is analogously read from the spatial light modulator in the similar manner.

Further objects and advantages of the present invention will be apparent from the following description of the preferred embodiments of the invention as illustrated in the accompanying drawings.

DESCRIPTION OF THE PREFERRED EMBODIMENTS

Hereinafter, an embodiment of the invention will be described with reference to the drawings.

Figure 1:
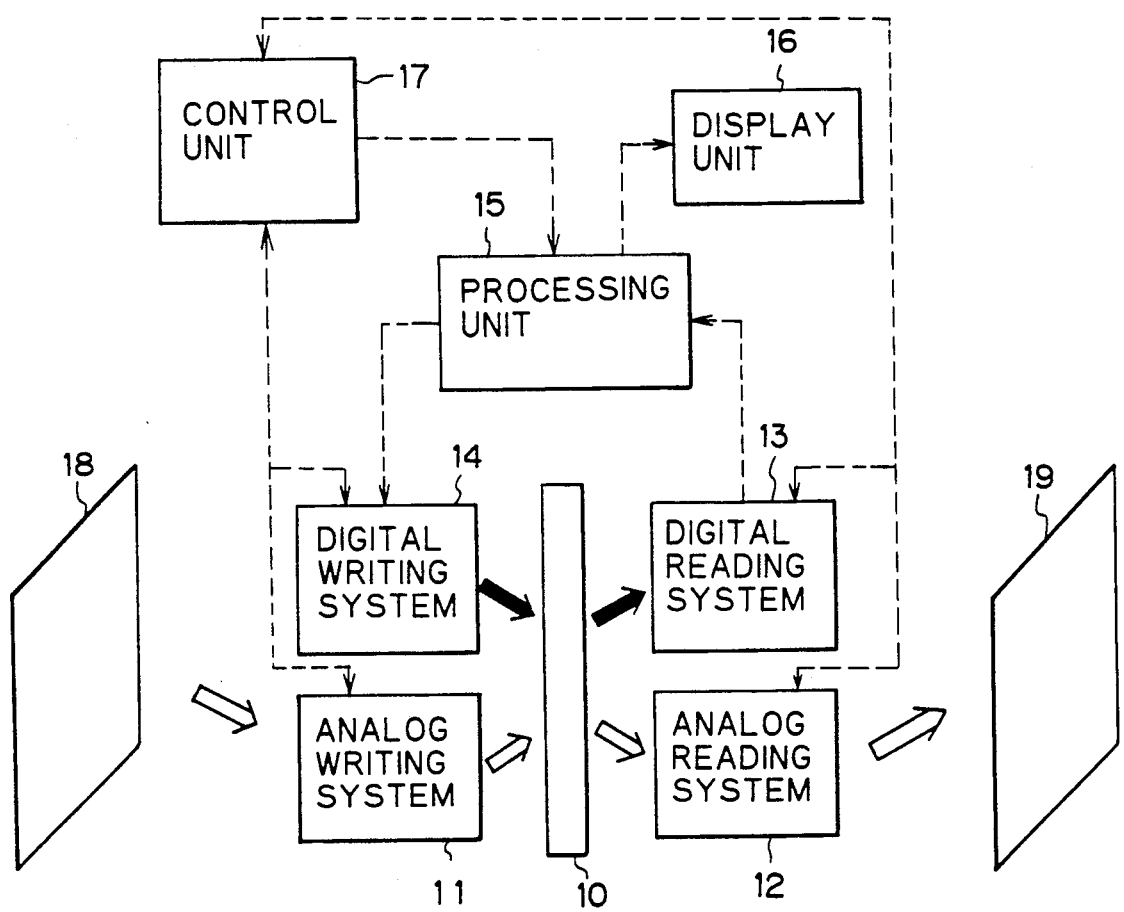
FIG. 1 is a block diagram schematically showing construction of a color image inputting, editing and outputting apparatus according to an embodiment of the present invention.

FIG. 1 is a block diagram showing overall arrangement of a color image inputting, editing and outputting apparatus according to an embodiment of the invention.

As shown in FIG. 1, reference numeral 10 denotes a spatial light modulator having an image-writing surface, reference numeral 11 denotes an analog writing system for analogously writing an image data to the spatial light modulator 10, reference numeral 12 denotes an analog reading system, reference numeral 13 denotes a digital reading system, and reference numeral 14 denotes a digital writing system.

The digital reading system 13 and the digital writing system 14 are electrically connected to a processing unit 15 in which several kinds of image processings are performed. The processing unit 15 is connected to a display unit 16 and a control unit 17.

The control unit 17 is mainly composed of a computer and is electrically connected to the analog writing system 11, the analog reading system 12, the digital reading system 13, and the digital writing system 14. In FIG. 1, white arrows denote analogously-scanned optical image data, black arrows denote digitally-scanned optical image data, and broken lines denote electric signals.

The spatial light modulator 10 is capable of temporarily storing the intensity distribution of light, that is, an image data, because the distribution of transmittance, the distribution of reflection, or the distribution of phase varies in response to the spatial intensity distribution of light (that is, an optical image) to be input. When another beam is applied to the spatial light modulator having an image data stored therein, the transmitted light, the reflected light, or the scattered light is modulated depending on the stored two-dimensional (spatial) image data. By detecting or exposing the transmitted light, the reflected light, or the scattered light being modulated, it is possible to read out the written image data from the spatial light modulator 10.

The spatial intensity distribution of the light to be input to the spatial light modulator 10 may be an analog image, that is, an optical image or a digital image obtained by two-dimensionally scanning the spatial light modulator 10 with the modulated laser beam. In reading out an image data from the spatial light modulator 10, by applying a spatially uniform intensity of light to the spatial light modulator 10, it is possible to obtain an analog image. Or by two-dimensionally scanning the spatial light modulator 10 with a laser beam having a constant intensity, it is possible to obtain a digital image.

The analog writing system 11 has a function of writing an optical image of an original 18 onto the spatial light modulator 10. This system 11 is mainly composed of a light source for lighting the original 18 and an optical system for focusing an optical image of the original 18 on the spatial light modulator 10.

The analog reading system 12 has a function of projecting the optical image written on the spatial light modulator 10 to a recording paper 19 like a photo-sensitive paper. This system 12 is mainly composed of a light source for lighting the spatial light modulator 10 and an optical system for focusing the image written on the spatial light modulating element 10 on the recording paper 19.

The digital reading system 13 has a function of reading out the image data written on the spatial light modulator 10 as an image signal in time sequence by applying a laser beam onto the spatial light modulator 10 two-dimensionally. This system 13 is mainly composed of a laser beam source, a laser beam scanning system, and a light-detecting system.

The digital writing system 14 has a function of writing a digital image on the spatial light modulator 10 depending on an image signal given from the processing unit 15. This system 14 is mainly composed of a laser beam source, a laser beam scanning system, and a laser beam modulating unit.

The processing unit 15 has a function of digitally processing an image signal applied from the digital reading system 13 and outputting the processed image signal to the digital writing system 14. The processing unit 15 serves to display the processed result on the display unit 16.

The combination of the foregoing systems and units results in implementing an image inputting, editing and outputting function. Further, the combination of the spatial light modulator 10, the digital reading system 13, the processing unit 15, and the digital writing system 14 results in implementing an image editing function. The combination of the analog writing system 11, the spatial light modulator 10, and the digital reading system 13 results in implementing an image scanner function. The combination of the digital writing system 14, the spatial light modulator 10, and the analog reading system 12 results in obtaining a printer function. The combination of the analog writing system 11, the spatial light modulator 10, and the analog writing system 11, the spatial light modulator 10, and the analog reading system 12 results in obtaining an analog copying function. Those functions are selected by a computer included in the control unit 17.

Figure 2:
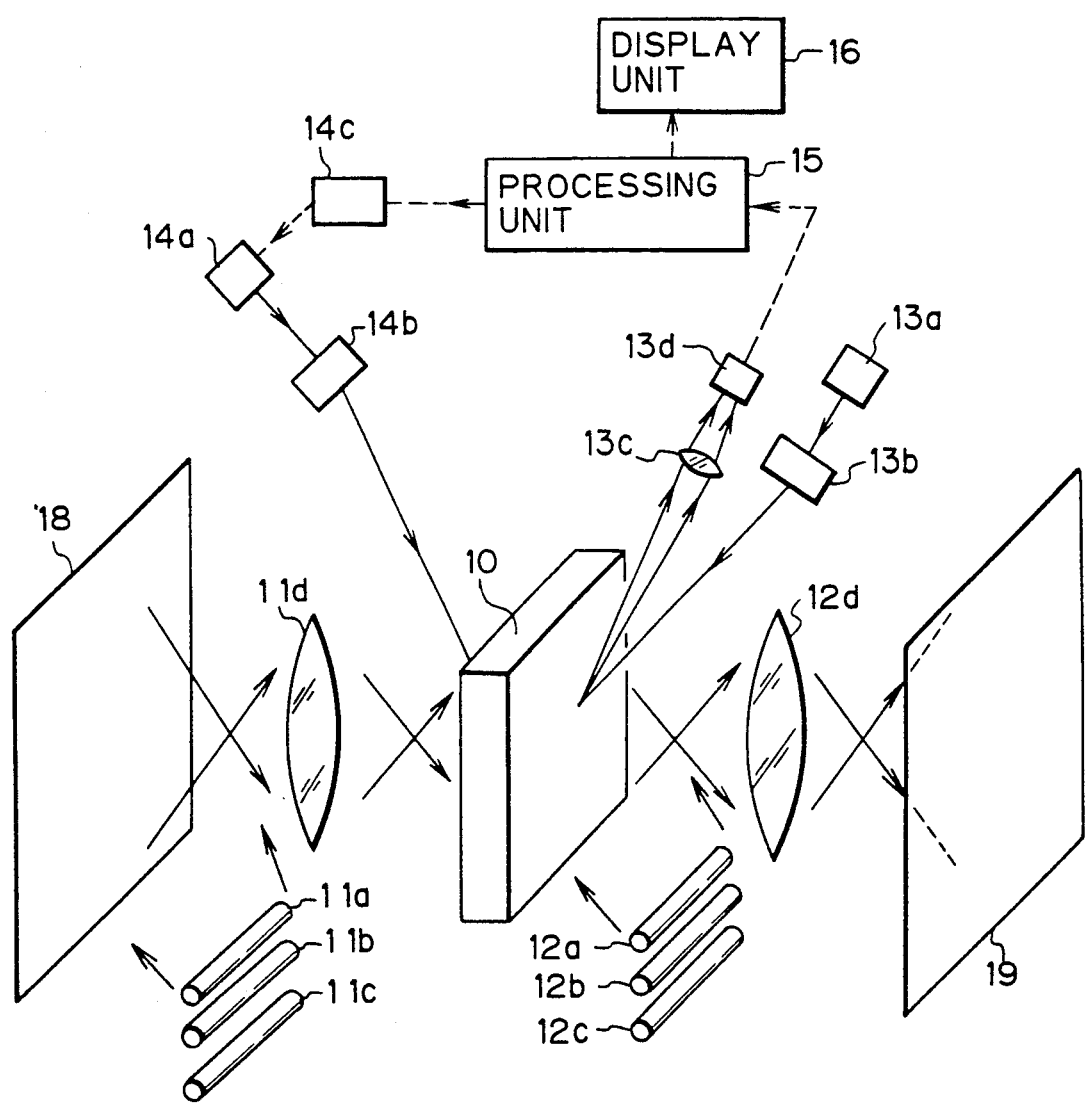
FIG. 2 is a view showing the apparatus shown in FIG. 1 in more detail.

FIG. 2 shows more detailed arrangement of the embodiment shown in FIG. 1.

The analog writing system 11 shown in FIG. 1 is composed of an optical system having R (red), G (green) and B (blue) three light sources (fluorescent lamps, for example) 11a, 11b and 11c, and a lens 11d. At first, the light sources 11a, 11b and 11c serve to sequentially apply a spatially uniform intensity of light to the original 18. Then, an optical image of the original 18 is reduced and projected on a writing plane of the spatial light modulator 10 through the effect of the lens 11d.

The color image of the original 18 is decomposed into each of the R, G and B colors at each corresponding process. At first, the R light source 11a is operated to apply a ray of light to the original so that an R image of the original is written on the spatial light modulator 10. After reading the image data, the G light source 11b is operated to apply a ray of light to the original so that the G image is written on the spatial light modulator 10. Then, after reading out the optical image, the B light source 11c is operated in a similar manner.

To obtain each color-decomposed image, a color filtering system may be used in place of the foregoing light source switching system.

This color filtering system is arranged to provide R, G and B color filters between the lens 11d and the spatial light modulator 10 for the purpose of obtaining each color-decomposed image by switching these filters in sequence. As concrete arrangement, the R, G and B color filters are pasted on a rotating body. The rotating body is allowed to be rotated so as to sequentially switch the color filters. This color filtering system employs as a light source a white light source like a halogen lamp.

In both systems, cyan, yellow and magenta may be used in place of red, green and blue.

The digital reading system 13 includes a laser beam source 13a, a laser beam scanning system 13b, a focusing lens 13c, and a photo-detector 13d. The laser beam source 13a serves to apply a constant light-intensity laser beam to the laser beam scanning system 13b through which the laser beam is deflected vertically and horizontally. It results in allowing the laser beam to scan the spatial light modulator 10 two-dimensionally. The laser beam is modulated depending on the image information of a pixel matching to the laser beam spot. The transmitted light, the reflected light, or the scattered light modulated according to the image information is applied to the photo-detector 13d through a lens 13c. The photo-detector 13d serves to convert the light into an electric signal. The image information written on the spatial light modulator 10 is allowed to be read in time sequence. To obtain the color image information, the foregoing reading operation is carried out about each color-decomposed image of R, G and B. The read image information is sent to the processing unit 15.

The laser beam source 13a employs a laser diode or a gas laser such as a He-Ne (helium-Neon) gas laser. The laser diode is so small that the overall apparatus is made compact. The gas laser provides so excellent coherency that the gas laser can supply a reduced beam spot. It results in enhancing a reading resolution.

The laser beam scanning system 13b serves to two-dimensionally move the laser beam emitted from the laser beam source 13a on the spatial light modulator 10 for scanning the element.

The photo-detector 13d can be composed of a high-speed photo-diode. However, in case that the laser beam is formed like a slit to extend in the sub-scanning direction for reading the image information corresponding to two or more lines (sub-scanning direction) at one time, the diode array or a charge-coupling device may be used as the photo-detector.

The digital writing system 14 includes a laser beam source 14a, a laser beam scanning system 14b, and a laser modulating circuit 14c.

The processing unit 15 applies a control signal to the laser modulating circuit 14c. The laser modulating circuit 14c serves to modulate the intensity of the laser beam generated in the laser beam source 14a depending on the control signal. In case that the laser diode is used as the laser beam source 14a, for modulating the intensity of the laser beam, it is necessary only to modulate the driving current of the laser diode. In case that the gas laser is used, it is necessary to add a modulator (not shown) for modulating the emitted laser beam outside of the laser modulating circuit 14c.

The modulated laser beam is then applied to the laser beam scanning system 14b in which the laser beam is deflected vertically and horizontally. It results in allowing the laser beam to two-dimensionally scan the spatial light modulator 10. The arrangement of the laser beam scanning system 14b is the same as that of the laser beam scanning system 13b. The laser beam spot on the spatial light modulator 10 matches to one pixel. The light intensity of each pixel represents a pixel tone.

The laser modulating circuit 14c is operated in synchronous to the laser beam scanning system 14b so that the digital image is allowed to be written on the spatial light modulator 10 on the basis of a signal supplied from the processing unit 15. For treating the color image information, the foregoing writing operation is carried out for each color of R, G and B.

The analog reading system 12 is composed of an optical system having three R, G and B light sources (fluorescent lamps, for example) 12a, 12b and 12c, and a lens 12d. The light sources 12a, 12b and 12c are operated to apply a spatially uniform intensity of light to the image written on the spatial light modulator 10 in sequence. The reflected light representing the image is expanded through the lens 12d and is projected on the recording paper 19.

In case that the image of R is written in the spatial light modulator 10, the R light source 12a is operated to apply a ray of light to the spatial light modulator 10 from which the light is reflected. The reflected light exposes the recording paper 19. The similar process is sequentially carried out for each color-decomposed image of G and B. Then, the recording paper 19 on which the R, G and B images are all exposed is developed for obtaining a color hardcopy.

Like the foregoing analog writing system 11, the analog reading system 12 may employ a color filtering system in place of a light source switching system. In addition, cyan, yellow, and magenta may be used in place of red, green and blue.

The processing unit 15 is mainly composed of a computer having a microprocessor and memories. The processing unit 15 receives an electric image signal which is converted from the reflected light in the photo-detector 13d. Then, the processing unit 15 serves to carry out an image processing such as tone processing (gamma correction, shading correction), sharpening (sharpness emphasis), area specification (trimming, masking), color processing (color reproduction, painting function, color cutting), movement (rotation), editing (embedded synthesizing, character synthesizing), and the like. The processed result is displayed on the display unit 16 so that an operator can process the image in an interactive manner as making sure of the resulting image. The processed image signal is output to the laser modulating circuit 14c.

In addition, the control unit 17 shown in FIG. 1 is not shown in FIG. 2.

Figure 3:
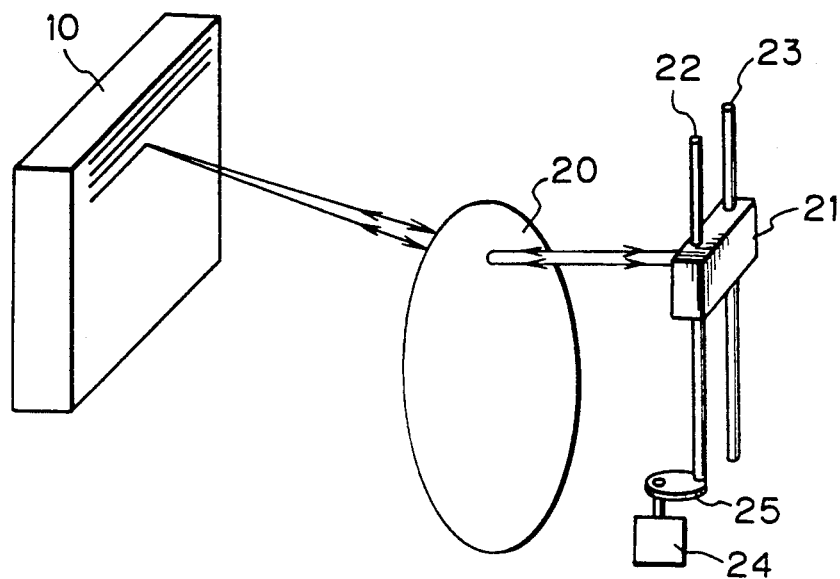
FIG. 3 is a view showing a laser beam scanning system of the apparatus shown in FIG. 2.

FIG. 3 shows construction of the laser beam scanning system 13b or 14b used in the embodiment shown in FIG. 2.

As shown in FIG. 3, the laser beam scanning system is composed of a hologram disk 20 and a laser beam source head 21. The hologram disk 20 includes hologram lenses located in a spiral manner. The laser beam source head 21 is arranged to keep a situation opposed to the hologram disk 20 and to move in a linear or circular manner. In the construction shown in FIG. 3, the laser beam source head 21 is supported on a feed screw 22 in a manner to linearly move in the radial direction of the hologram disk 20. The feed screw 22 is rotated through the effect of the rotating driving force of a motor 24, which is transmitted through a belt 25. Reference numeral 23 denotes a guide shaft which is mounted in parallel to the feed screw 22. The guide shaft 23 serves to guide the laser beam source head 21 in a manner to keep a constant angle formed between the laser beam source head 21 and the hologram disk 20. In addition, the laser beam source head 21 may be composed in a manner to be moved by a linear motor.

Figure 4:
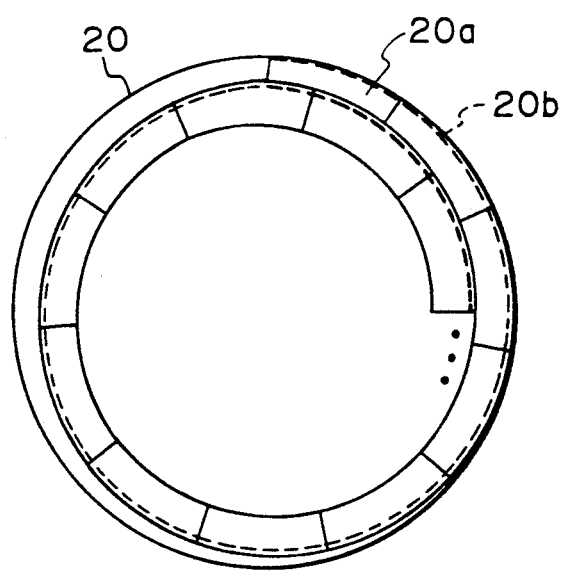
FIG. 4 is a plane view showing a hologram disk used in the embodiment.

FIG. 4 is a plane view showing an example of the hologram disk 20.

As shown in FIG. 4, the hologram disk 20 is composed of a plurality of slender hologram lenses 20a located in a spiral manner. Each hologram lens 20a is provided to form the corresponding scan line on the spatial light modulator 10. Each scan line is formed on vertically different locations. Hence, each hologram lens 20a has the corresponding size and form.

In case that the outer diameter of the hologram disk 20 is 220 mm (millimeter) and the inner diameter is 70 mm, about 700 hologram lenses, each of which has a length of 25 mm, are allowed to be pasted on the hologram disk 20 at regular pitches of 3 mm from the outer peripheral portion to the inner peripheral portion (The laser spot on the hologram lens has a diameter of about 2 mm). In other words, one hologram disk 20 makes it possible to provide 700 scan lines. In this case, each hologram lens has the corresponding length.

It is necessary to synchronize the sampling frequency of the photo-detector 13d and a modulated frequency of the laser modulating circuit 14c with the scanning speed of the laser beam applied on the spatial light modulator 10. Hence, it is desirous to adjust the scanning speed of the laser beam applied on the spatial light modulator 10 to be constant, because it is not easy to detect the scanning speed of the laser beam at each hologram lens for synchronizing both frequencies.

In general, the scanning speed of the laser beam applied on the spatial light modulator 10 depends on the moving speed of the laser beam and the optical characteristics of the hologram lens. However, in case that the hologram lenses are located in a spiral manner as in the present embodiment, a constant rotation speed of the hologram disk does not necessarily lead to a constant moving speed of the laser beam applied on the hologram disk surface. To compensate for the difference, it is possible to change the optical characteristic of each hologram lens. This method results in greatly constraining and complicating design of the hologram lens.

In this embodiment, the rotation speed of the hologram disk is variably controlled so as to keep the moving speed of the laser beam applied on the hologram disk surface constant. To precisely control the rotation speed of the hologram disk 20, markers 20b are provided on the hologram disk 20. The markers 20b are arranged at regular intervals on the hologram disk 20 so that the alternate ones of the markers 20b have the corresponding reflection factor. The markers 20b are used for detecting the rotation speed of the hologram disk 20 and a relative location (tracking) between the hologram lens and the laser beam.

The hologram disk 20 may be composed of hologram lenses located in a concentric manner unlike the lenses located in a spiral manner as shown in FIG. 4. In the construction, after the laser beam runs around the hologram lens at a certain radial location, the laser beam shifts to the inner hologram lens and then runs around the inner hologram lens at the corresponding radial location. Hence, in this case, the laser beam source head is moved in a stepwise manner, and the rotation speed of the hologram disk is variably controlled in a stepwise manner.

Figure 5:
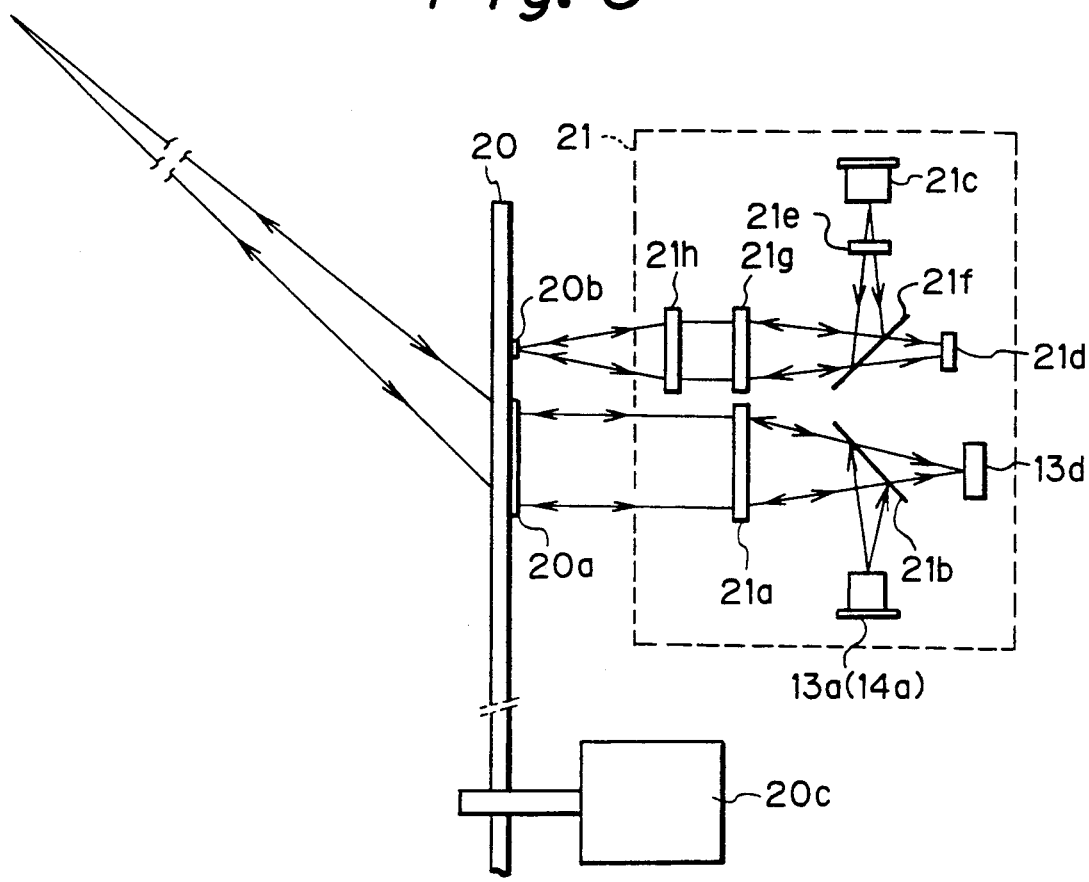
FIG. 5 is a sectional view showing a structure of the hologram disk and a laser beam source head used in the embodiment.

FIG. 5 is a sectional view showing the structure of the hologram disk 20 and the laser beam source head 21.

As shown in FIG. 5, the laser beam optical system is composed of a main-optical system for reading or writing the data and a sub-optical system for detecting the rotation speed and tracking of the hologram disk 20.

The main-optical system provides the laser beam source 13a (14a), a beam splitter 21b, a collimator lens 21a, and the photo-detector 13d. The sub-optical system provides a laser beam source 21c, an diffraction grating 21e, a beam splitter 21f, a collimator lens 21g, an objective lens 21h, and the photo-detector 21d.

Then, the operation of the main-optical system will be described below.

The laser beam source 13a (14a) is operated to apply a laser beam to the collimator lens 21a through the beam splitter 21b. The laser beam is changed to a parallel beam through the effect of the collimator lens 21a and then the parallel beam reaches to the hologram lens 20a. As the hologram lens 20a is rotated, the parallel beam draws one scan line on the spatial light modulator 10. Then, the next hologram lens 20a serves to draw another scan line.

That is, as the laser beam traces each hologram lens 20a provided on the hologram disk 20, the laser beam serves to scan the spatial light modulator 10 two-dimensionally.

Each hologram lens 20a is designed to have parameters such as a wavelength of an exposing beam, a wavelength of a reproducing beam, that is, a wavelength of the laser beam source 13a (14a), a distance between the hologram lens and the spatial light modulator, a distance between a beam-incident location on the hologram disk surface and an axis of rotation, a beam diameter on the hologram disk surface, a focus point of a spherical wave of the exposing beam, and a focus point of a spherical wave of the reproducing beam. According to the present embodiment, the distance between the beam-incident location of the hologram disk surface and the axis of rotation is respective in each hologram lens 20a. Hence, each hologram lens is adjusted on the corresponding parameters in designing it. For mass-producing the hologram disk, one complete original disk should be duplicated.

Then, the operation of the sub-optical system will be described below.

The laser beam emitted from the laser beam source 21c is divided into three parts through the effect of the diffraction grating 21e. Each divided laser beam is used as a sub-beam for tracking. These divided three parts of beam are applied to the marker 20b on the hologram disk 20 through the beam splitter 21f, the collimator lens 21g, and the objective lens 21h. The beam reflected on the marker 20b is led to the photo-detector 21d through a reverse optical path. The photo-detector 21d is composed of a three-divided photo-diode. A tracking error signal can be obtained from a difference between the outputs of both side parts of the photo-diode. A rotation servo signal of the hologram disk 20 can be obtained from the output of the central part of the photo-diode.

The number of rotations of the motor 24 connected to the feed screw 22 is controlled depending on the tracking error signal.

As a method for detecting a tracking error signal, a wobbling method or a push-pull method may be used. Further, it is possible to take a method of applying a laser beam whose width is wider than the marker to the marker, detecting the reflected beam in the two-divided photo-detector, and obtaining a tracking error signal from a difference between these signal outputs.

Reference symbol 20c denotes a motor for driving the hologram disk 20. The rotation speed of the motor 20c is controlled depending on the rotation servo signal. Assuming that the marker 20b is located at constant pitches, by controlling the rotation speed of the motor 20c for keeping the rotation servo signal as a constant frequency, it is possible to keep the linear speed of the laser beam applied on the hologram lens 20a constant.

The foregoing operations makes it possible to obtain the rotation servo signal and the tracking error signal from the marker 20b.

In scanning the spatial light modulator 10 at low resolution, the laser beam source head 21 is allowed to be moved in a predetermined manner without performing the tracking servo function. As an alternative method, it is possible to detect the hologram lens 20a and change the rotation speed of the hologram disk 20 on time without performing the rotation servo with respect to the hologram disk.

Figure 6:
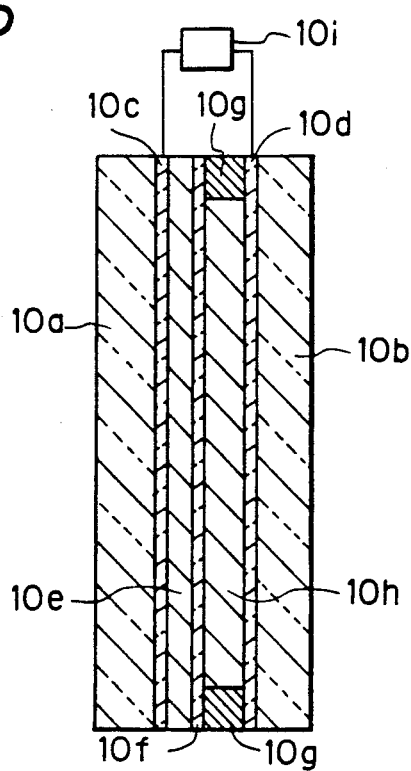
FIG. 6 is a sectional view showing a spatial light modulator used in the embodiment.

FIG. 6 is a sectional view showing the spatial light modulator 10.

As shown in FIG. 6, reference symbols 10a and 10b denote glass plates located on both sides of the spatial light modulator 10. An electrode 10c is laminated on the inside surface of the glass plate 10a. Then, on the inside surface of the electrode 10c are sequentially laminated a photoconductive layer 10e and a light-shielding film 10f. An electrode 10d is laminated on the inside surface of the other glass plate 10b.

Reference symbol 10g denotes spacers inserted between the electrode 10d and the light-shielding film 10f. A liquid-crystal 10h is injected and sealed in the space defined by the electrode 10d, the light-shielding film 10f and the spacers 10g.

The electrodes 10c and 10d are connected to a power source 10i. The electrodes 10c and 10d are transparent electrodes and are, preferably, composed of an Indium Tin Oxide (ITO) film.

The photoconductive layer 10e may be cadmium sulfide (CdS), cadmium telluride (CdTe), selenium (Se), zinc sulfide (ZnS), bismuth silicone oxide (BSO), amorphous silicon, or organic photoconductive material. For processing the color image, the amorphous silicon is the best choice for the photoconductive layer 10e, because the amorphous silicon has a flat wavelength sensitivity in the overall range of visible light.

The photoconductive layer 10e has a characteristic that molecular orientation of the liquid-crystal is changed depending on the incident light. Hence, another photoconductive material which has characteristic of variable resistance depending on the incident light may be used for photoconductive layer. For example, the photoconductive material is a material for generating a voltage in response to light (solar cell, for example), a material for generating heat in response to light, or a material for changing its structure in response to light (photochromic compound, for example). The latter two materials have a characteristic that the molecular orientation of the liquid-crystal is changed directly depending on light without having to convert the light into an electric signal.

The light-shielding film 10f is provided so as to prevent a laser beam or white light from being intruded into the photoconductive layer 10e when reading out the image data from the spatial light modulator 10. This is because when the laser beam or white light reaches the photoconductive layer 10e, the beam or light serves to erase the written information. The light-shielding film 10e may use a non-transparent film having electric isolation such as a dielectric mirror made of silicon monoxide (SiO).

The glass plates 10a and 10b are transparent and serve as a base plate for sealing the liquid-crystal 10h. In place of the glass plate, hence, a transparent plastic or ceramic plate may be used.

In the present embodiment, the liquid-crystal 10h has a hybrid electric field effect but does not have a storage function.

The power source 10i serves to apply a d. c. (direct current) voltage between the electrodes 10c and 10d so as to fill charges between the electrodes 10c and 10d. Then, the power source 10i is disconnected from the electrodes 10c and 10d. In this state, the optical image is entered to the photoconductive layer 10e by projecting planar image light or emitting a laser beam with the modulated intensity to the photoconductive layer 10e. It results in distributing the resistance of the photoconductive layer 10e depending on the distribution of the light intensity. It means that the resistance lowers on the light-hit portion of the photoconductive layer 10e and the high resistance is kept on the remaining portion, that is, the portion where no light is hit. Then, the voltage formed depending on the distribution of light intensity is applied to the liquid-crystal 10h so as to change the molecular orientation of liquid-crystal, resulting in allowing an optical image to be written on the liquid-crystal 10h.

The factor for determining how degree the liquid-crystal molecules are oriented lies on a voltage applied on each point of the liquid-crystal. This applied voltage depends on the intensity of light to be entered into the photoconductive layer 10e and the voltage supplied from the power source 10i.

To erase the image data written on the spatial light modulator 10, it is necessary only to apply uniform ray of light to the photoconductive layer 10e or short-circuit between the electrodes 10c and 10d.

The liquid-crystal 10h may have a storage function (memory function). The liquid-crystal having a storage function is, for example, a dynamic scattering (DS) type liquid-crystal, a phase transfer type liquid-crystal, a smectic A liquid-crystal, or a dielectric liquid-crystal.

As one example, the description will be directed to the operation of writing or reading an image onto or from the spatial light modulator using the dynamic scattering (DS) mode liquid-crystal.

When a d. c. voltage or an a. c. (alternate current) voltage having a low frequency of about 100 Hz is applied to the dynamic scattering type liquid-crystal, the liquid-crystal is dynamically scattered, thereby being entered into an emulsive state. The liquid-crystal keeps this state if the voltage is turned off. Then, by applying a voltage having a higher frequency (for example, 700 Hz) than the cut-off frequency and a relatively strong uniform ray of light to the liquid-crystal, the stored image data is erased. This phenomenon applies to the spatial light modulator.

For writing an image on the spatial light modulator 10, when the power source 10i applies the d. c. voltage or a. c. voltage having a low frequency of about 100 Hz between the electrodes 10c and 10d, at the same time, light image data are entered to the photoconductive layer 10e forming the image-writing surface by projecting the planar light thereon or applying an intensity-modulated laser beam thereto. It results in distributing the resistance of the photoconductive layer 10e depending on the distribution of light intensity. That is, the resistance rises on the light-hit portion of the photoconductive layer 10e and the high resistance is kept on the remaining portion of the photoconductive layer 10e where no light is hit. Hence, the voltage depending on the distribution of light intensity is applied to the liquid-crystal 10h, resulting in causing only the voltage-applied portion of the liquid-crystal to be scattered.

For reading out the image data from the spatial light modulator 10, when uniform light is applied to the overall surface of the spatial light modulator 10, it results in obtaining scattered light or reflected light modulated depending on the information written on each point of the spatial light modulator 10. Then, by focusing the obtained light through the lens, it is possible to read out an analog image. By applying a spot beam like a laser beam to the spatial light modulator 10, it is possible to read out the pixel information on the spot of the spatial light modulator 10.

For erasing the overall image data written on the spatial light modulator 10, when a high-frequency a. c. voltage is applied between the electrodes 10c and 10d, it is necessary only to apply a relatively strong uniform light to the overall surface of the photoconductive layer 10e.

In case that the liquid-crystal 10h has a storage function, no writing of an image data to the spatial light modulator 10 is allowed to be performed unless both of the light and voltage are applied to the photoconductive layer 10e at a time. It means that the written image data does not change even if one of the laser beam or spatially uniform intensity of light is applied to the photoconductive layer 10e. Hence, the light-shielding film 10f is not required between the liquid-crystal 10h and the photoconductive layer 10e because it is unnecessary to prevent the light from being applied to the photoconductive layer 10e in reading out the image data. It means that the reading optical system may be a transparent type. Further, the reading laser beam may be applied from the glass plate 10a side or the glass plate 10b side. Further, the reading optical system may be a reflective type if the light-shielding film 10f may be provided.

In particular, if the reading laser beam is arranged to be applied from the writing side, the digital writing and reading systems are allowed to serve as the almost other optical systems as well.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing apparatus comprising:
   a spatial light modulator;
   a digital reading system for digitally reading an image data written on said spatial light modulator by two-dimensionally moving a laser beam on said spatial light modulator for scanning;
   a processing unit for processing the read image data; and a digital writing system for digitally writing the processed image data on said spatial light modulator by two-dimensionally moving the laser beam on said spatial light modulator;

wherein at least one of said digital reading and writing systems provides a hologram disk having a plurality of hologram lenses located in a concentric manner or spiral manner and said hologram disk is arranged to deflect the laser beam for scanning said spatial light modulator.

2. An image processing apparatus according to claim 1, wherein said hologram disk includes a plurality of hologram lenses having respective sizes and forms, and by said hologram disk the laser beam is scanned two-dimensionally on said spatial light modulator.

3. An image processing apparatus according to claim 1, wherein said hologram disk is composed of a plurality of hologram lenses having respective sizes and forms, and said hologram disk includes markers formed at regular pitches, said markers being used for keeping a linear scanning speed of the laser beam applied on said hologram disk constant.

4. An image processing apparatus according to claim 1, wherein said apparatus comprises an analog writing system for analogously writing an optical image on said spatial light modulator by applying the optical image to said spatial light modulator and an analog reading system for analogously reading an optical image written on said spatial light modulator by applying a ray of light to said spatial light modulator.

5. An image processing apparatus according to claim 1, wherein said apparatus comprises a control unit for controlling said digital writing and reading system, and a display unit connected to said processing unit and for displaying the read image.

6. An image processing apparatus according to claim 1, wherein said digital writing system includes a first laser beam source for emitting a laser beam, a first laser beam scanning system for deflecting said laser beam, and a laser beam modulating circuit for modulating intensity of said laser beam emitted from said laser beam source, said first laser beam scanning system being operated in synchronous to said laser beam modulating circuit, and wherein said digital reading system includes a second laser beam source for emitting a laser beam, a second laser bean scanning system for deflecting said laser beam vertically and horizontally, a lens for focusing said laser beam, and a photo-detector for converting the beam reflected on said spatial light modulator into an electric signal.

7. An image processing apparatus according to claim 4, wherein said analog reading system includes three light sources for sequentially applying a spatially uniform intensity of light to said spatial light modulator and a lens for expanding and projecting the light reflected from said spatial light modulator onto a recording paper, and wherein said analog writing system includes three light sources for sequentially applying a spatially uniform intensity of light to said spatial light modulator and a lens for reducing and projecting the optical image written on said spatial light modulator.

8. An image processing apparatus according to claim 6, wherein at least one of said first and second laser beam scanning system is composed of said hologram disk and a laser beam source head, said laser beam source head being linearly or circularly moved in a manner to keep itself opposed to said hologram disk.

9. An image processing apparatus according to claim 8, wherein said laser beam source head is composed of a main-optical system and a sub-optical system, said main-optical system providing a laser beam source, a beam splitter, a collimator lens and a photo-detector, and said sub-optical system providing a laser beam source, a diffraction grating, a beam splitter, a collimator lens, an objective lens and a photo-detector.

10. An image processing apparatus according to claim 1, wherein said spatial light modulator includes a photoconductive layer, a liquid-crystal layer laminated on said photoconductive layer, a pair of electrodes sandwiching said photoconductive layer and said liquid-crystal layer, and spacer inserted between one of said pair of electrodes and said photoconductive layer.

11. An image processing apparatus according to claim 10, wherein said spatial light modulator includes a light-shielding film between said liquid-crystal layer and said photoconductive layer.

12. An image processing apparatus according to claim 1, wherein said hologram disk includes markers for obtaining tracking error signal, said tracking error signal controlling a feed screw for hitting laser beam in main-optical system hologram lenses.

13. An image processing apparatus comprising:
a spatial light modulator;
a digital reading system for digitally reading an image data written on said spatial light modulator by two-dimensionally moving a laser beam on said spatial light modulator for scanning;
a processing unit for processing the read image data; and
a digital writing system for digitally writing the processed image data on said spatial light modulator by two-dimensionally moving the laser beam on said spatial light modulator;
wherein at least one of said digital reading and writing systems provides a hologram disk, the hologram disk having a plurality of hologram lenses located in at differing radial distances from a center of the hologram disk.

14. an image processing apparatus according to claim 13, wherein the hologram lenses have an arcuate shape.

15. An image processing apparatus according to claim 13, wherein the plurality of hologram lenses are concentrically arranged on the disk.

16. An image processing apparatus according to claim 13, wherein the plurality of hologram lenses are arranged in a spiral manner on the disk.

17. An image processing apparatus according to claim 13, wherein a plurality of hologram lenses are located at the same radial distance.

18. An image processing apparatus according to claim 13, wherein each hologram lens is configured to provide a corresponding scan line on the spatial light modulator.

19. An image processing apparatus comprising:
a spatial light modulator;
a digital reading system for digitally reading an image data written on said spatial light modulator by two-dimensionally moving a laser beam on said spatial light modulator for scanning;
a processing unit for processing the read image data; and
a digital writing system for digitally writing the processed image data on said spatial light modulator by two-dimensionally moving the laser beam on said spatial light modulator;

wherein at least one of said digital reading and writing systems provides a hologram disk, the hologram disk having a having a plurality of hologram lenses located a same radial distance from a center of the hologram disk.

20. An image processing apparatus according to claim 19, wherein the hologram lenses have an arcuate shape.

21. An image processing apparatus according to claim 20, wherein the hologram disk has a plurality of hologram lenses located at differing radial distances from the center of the hologram disk.

22. An image processing apparatus according to claim 21, wherein the plurality of hologram lenses are concentrically arranged on the disk.

23. An image processing apparatus according to claim 19, wherein the plurality of hologram lenses are arranged in a spiral manner on the disk.

24. An image processing apparatus according to claim 19, wherein each hologram lens is configured to provide a corresponding scan line on the spatial light modulator.

* * * * *